United States Patent
Yamamoto

[11] Patent Number: 4,932,503
[45] Date of Patent: Jun. 12, 1990

[54] BLIND ASSEMBLY OF PARKING BRAKE CABLE TO PARKING BRAKE LEVER

[75] Inventor: Mayjue A. Yamamoto, Yellow Springs, Ohio

[73] Assignee: General Motors Corporation, Detroit, Mich.

[21] Appl. No.: 286,112

[22] Filed: Dec. 19, 1988

[51] Int. Cl.$^5$ ............................................... F16D 51/00
[52] U.S. Cl. ............................ 188/2 D; 74/501.5 R; 188/106 A; 188/106 F; 413/105
[58] Field of Search .................. 188/2 D, 78, 79, 328, 188/33, 325, 106 R, 106 A, 106 F, 106 P, 329; 79/501.5, 502.4, 502.5, 502.6; 403/105, 361

[56] References Cited

U.S. PATENT DOCUMENTS

| | | | |
|---|---|---|---|
| 29,461 | 8/1860 | Burchell | 403/105 |
| 3,587,341 | 6/1971 | Fiddler | 403/105 |
| 3,662,617 | 5/1972 | Bennett et al. | 403/105 |
| 4,610,180 | 9/1986 | Spease | 403/105 |
| 4,753,325 | 6/1988 | Jaksic | 188/2 D |

*Primary Examiner*—Andres Kashnikow
*Assistant Examiner*—Matthew C. Graham
*Attorney, Agent, or Firm*—Ernest E. Helms

[57] ABSTRACT

A drum brake assembly having a parking brake actuating lever is so arranged that the parking brake cable end may be assembled in a blind fashion to the end of the actuating lever. The cable is provided with an enlarged end or button. The cable and spring are inserted through a guide tube and pushed inwardly into the brake assembly with the guide tube or a combination of the guide tube and a separate spring guide placing the cable button in alignment so that it is aimed at a funnel-like guide and retention member formed on the end of the parking brake actuating lever. Further axial movement of the parking brake cable and its enlarged end result in a camming action which moves the enlarged end through a one-way snap connection so that the cable is able to apply cable tension forces to the parking brake actuating lever. The entire assembly may be made with the brake assembly in the completely assembled condition wherein the drum covers the brake mechanism so that the assembler-operator cannot either see or manipulate that cable end and the connection thereof with the end of the actuating lever. The arrangement also provides for sealing the opening in the drum brake backing plate through which the parking brake cable extends, and permits checking for full connection of the parking brake cable with the actuating lever before such assembly is completed.

3 Claims, 1 Drawing Sheet

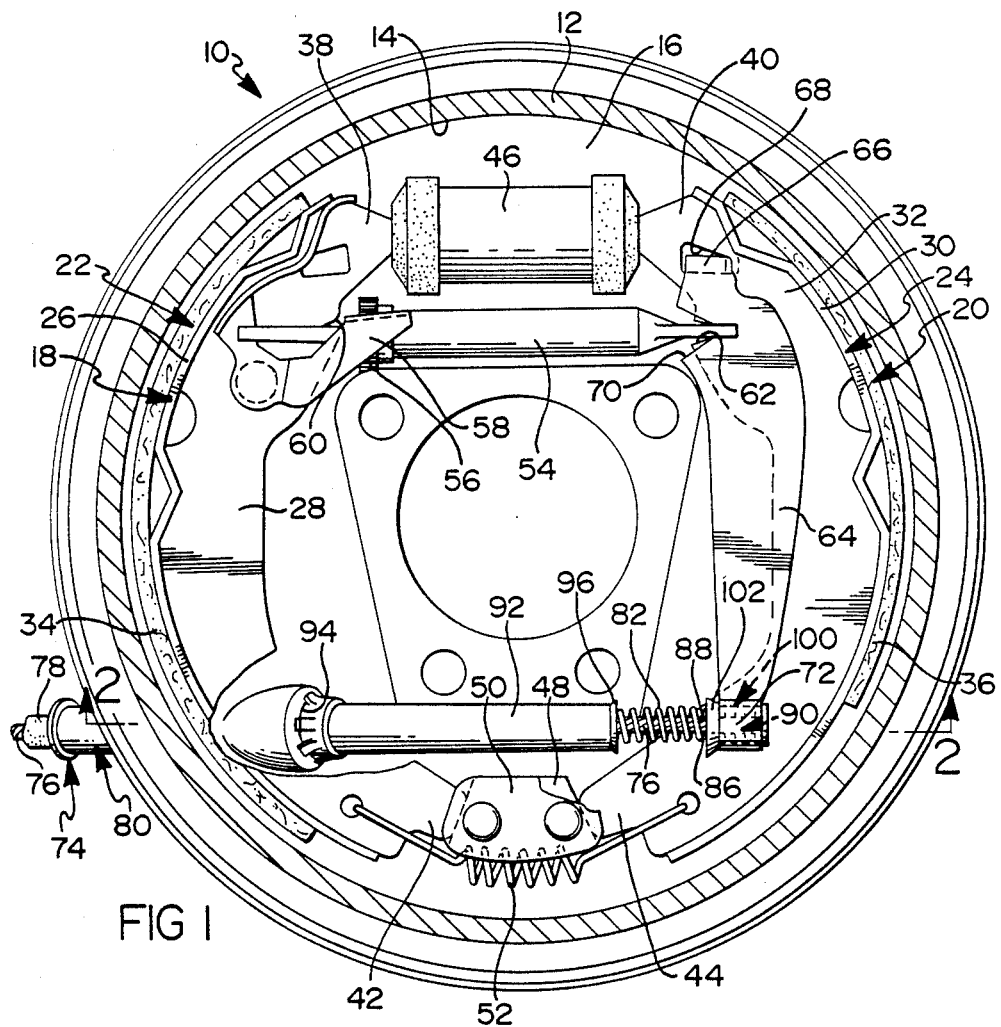
FIG 1
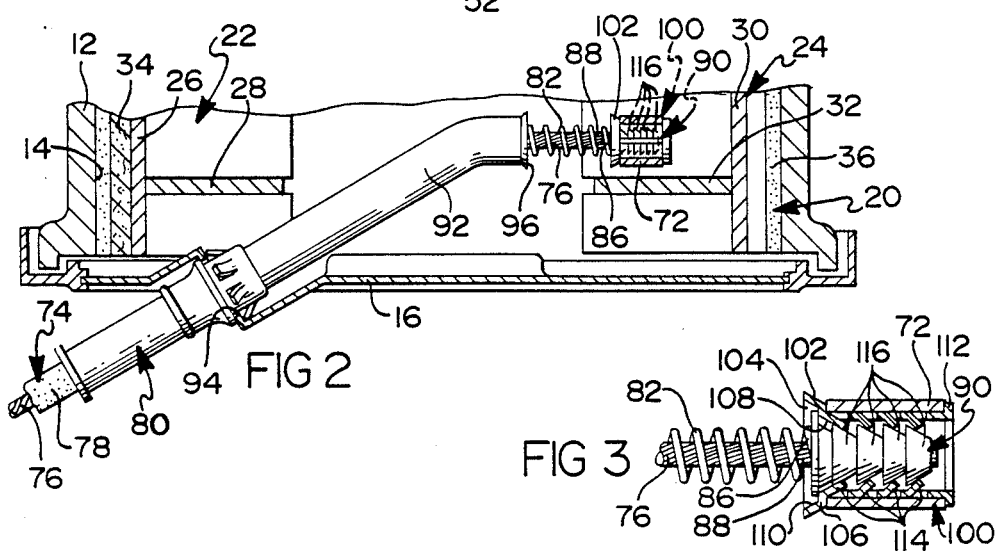
FIG 2
FIG 3

BLIND ASSEMBLY OF PARKING BRAKE CABLE TO PARKING BRAKE LEVER

CROSS-REFERENCE TO RELATED APPLICATIONS

The arrangement embodying the invention is related to the broad concept disclosure of U.S. Pat. Application Ser. No. 117,120, filed on Nov. 4, 1987, entitled "Blind Assembly of Parking Brake Cable to Parking-Brake Lever," and assigned to the common assignee. That disclosure specifically employed a slotted funnel guide and retention member formed on the parking brake lever, and disclosed several types of guide members.

The invention is also related to U.S. Pat. Applications Ser. No. 286114 entitled "Blind Cable Assembly"; and Ser. No. 286109 entitled "Blind Cable Assembly"; both filed on even date herewith.

BACKGROUND OF THE INVENTION

Typical drum brake parking brake actuating mechanisms used on automobiles for many years (and still being used) have required that the parking brake cable be inserted through the backing plate opening and positioned in approximate relation to the connection point with the parking brake actuating lever, which is pivotally mounted on one of the brake shoe assemblies. The assembly operator then has to maneuver the end of the parking brake cable and/or the parking brake actuating lever to make the connection. This therefore requires that such an assembly be done with the drum brake's being off of the remainder of the brake assembly so that visual and manipulative capabilities are present to complete the assembly. A typical example of such a connection requiring this type of assembly is disclosed in U.S. Pat. No. 3,064,767 entitled "Brake Actuator," and issued Nov. 20, 1962.

FIELD OF THE INVENTION

The invention relates to a drum brake assembly having a parking brake mechanism including a parking brake lever connected to a parking brake cable so that, when the cable is tensioned, the drum brake is mechanically applied for parking brake purposes. It more particularly relates to such a drum brake in which the connection of the parking brake cable to the parking brake lever within the drum brake assembly is made in a blind manner; that is, with the person assembling the cable to the lever being able to do so with the drum brake completely assembled on the vehicle.

The arrangement embodying the invention permits the parking brake cable assembly to be inserted through the appropriate opening in the backing plate and to be guided and connected to an end of the parking brake actuating lever which is pivotally mounted on one of the brake shoe assemblies, without the assembly operator's having to see the parts as they are known as a blind assembly because the operator cannot see or manipulate each of the components being attached together within the drum brake assembly.

The arrangement is such that, once the mechanism is installed and in position, the assembly operator may pull outwardly on the parking brake cable and check that the cable is properly engaged with and secured to the end of the parking brake actuating lever. Once such engagement is confirmed, the assembly is completed by inserting a conduit assembly into snap-in engagement with a tube guide mounted in the backing plate opening, completing the cable assembly into the brake.

SUMMARY OF THE INVENTION

More specifically, an arrangement is provided on the end of the parking brake actuating lever to receive the button end of the parking brake cable itself and cammingly guide the button end into a tubular retention device, the button end having a series of ridges thereon and the tubular retention device having a series of tabs extending inwardly and axially so as to permit button ridges to move therepast but prevent reverse axial movement. Thus, essentially a one-way connection is provided. The button is moved into its final engaged position by axial movement of the cable and button, at which time the cable section extends through the guide and retention mechanism on the end of the actuating lever. In order to accomplish this, the parking brake cable must be capable of being aimed or prepositioned so that it is able, upon axial assembling movement thereof, to engage the end of the parking brake actuator and then to accomplish the connection. As more fully disclosed in application Ser. No. 117,120 noted above, this may be done by providing a tube guide mounted in an opening in the backing plate which extends from a laterally offset position at the backing plate to a laterally aligned position in spaced relation to the guide and retention means of the actuating lever so that, when the parking brake cable is inserted and moved axially, the enlarged cable end section will be guided and connected, as noted above. The parking brake actuating lever return spring is positioned about the parking brake cable, and will also act as a guide for the cable and its enlarged button-like end, particularly throughout the space between the end of the tube guide and the point at which the cable enlarged end or button is received by the guide and retention means. In one arrangement in application Ser. No. 117,120, the tube guide extends through much of the distance between the opening in the backing plate in which it is mounted and the actuating lever guide and retention means. In that instance, it is advantageous to so curve the tube guide as to position it so it is aimed at the parking brake cable end properly for blind assembly, as above noted. This is the embodiment disclosed herein to be used in conjunction with the claimed improvement, but other embodiments, such as the relatively short tube guide and the separate spring guide also disclosed in the above noted application Ser. No. 117,120, may be employed. In either arrangement, it is preferred that the spring has one end thereof secured in the conduit assembly provided on the end of the parking brake cable assembly in the area where it may be located within and connected to the tube guide mounted through the backing plate opening. Thus, the parking brake cable assembly includes the conduit assembly, the parking brake cable itself, the cable return spring and a parking brake cable enlarged end.

The operator will insert the parking brake cable assembly through the tube guide and move the cable and its enlarged end axially until the blind connection is completed. The operator may then pull back on the parking brake assembly to check that the connection is actually completed, feeling an appropriate resistance to such movement. The conduit assembly may then be snapped into position in the tube guide.

It is, therefore, a feature of the invention herein disclosed and claimed to provide a ratchet-like one-way connection mechanism which permits a blind assembly of one parking brake cable end to one end of the parking brake actuating lever.

BRIEF DESCRIPTION OF THE DRAWING

FIG. 1 is an elevation view of a drum brake assembly embodying the invention, with parts broken away and in section.

FIG. 2 is a cross-section view, taken in the direction of arrows 2—2 of FIG. 1, showing the preferred embodiment of the invention with portions thereof in elevation.

FIG. 3 is an enlarged fragmentary view of a portion of FIG. 2 illustrating further details of the invention.

DESCRIPTION OF THE PREFERRED EMBODIMENT

The drum brake assembly 10 of FIG. 1 includes a rotatable drum 12 having an internal drum friction surface 14. The assembly has a backing plate 16 on which is mounted a first brake shoe assembly 18 and a second brake shoe assembly 20 for movement into and out of engagement with the drum friction surface 14 for brake actuation and release, as is well known in the art.

Shoe assemblies 18 and 20 respectively include shoes 22 and 24, respectively having a rim 26 and a web 28, and a rim 30 and a web 32. Shoe assembly 18 has a brake lining 34 secured to the rim 26, and shoe assembly 20 has a brake lining 36 secured to rim 30. The outer surfaces of the linings 34 and 36 provide lining friction surfaces which mate with the drum friction surface 14 during brake actuation. The shoe assemblies 18 and 20 respectively have upper shoe end 38 and 40 and lower shoe ends 42 and 44. The upper shoe ends are arranged to be operatively engaged by pistons in the wheel cylinder 46 so that the shoe assembly may be hydraulically actuated for service brake operation. As is well known in the art, a suitable service brake operator, such as a master cylinder, provides hydraulic brake fluid under pressure to the wheel cylinder 46 to expand the pistons therein and move the shoe ends 38 and 40 apart so that the linings 34 and 36 are moved into braking engagement with the drum friction surface 14. In the particular brake assembly 10 illustrated, the brake shoe assemblies are arranged in a leading-trailing manner. Therefore, the lower shoe ends 42 and 44 are positioned to engage a fixed anchor 48 at the bottom of the assembly and radially opposite the wheel cylinder 46. The lower shoe ends are guided in position relative to the backing plate by the shoe retainer 50 which is secured to anchor 48. The lower shoe ends 42 and 44 are continuously urged toward the anchor 48 by the spring 52.

The drum brake assembly 10 may also be of other well known types such as the duo servo, leading-leading, and trailing-trailing types. Although not shown, it is to be understood that a suitable brake shoe return spring is connected to the brake shoe rims 26 and 30 in the general area of the wheel cylinder 46 so as to continually urge the upper shoe ends 38 and 40 toward the retracted position. This arrangement is also well known in the art.

The brake assembly is illustrated as having a brake adjuster mechanism, which includes a spreader bar or strut 54, an adjuster wheel 56, and an adjuster lever 58, all well known in the art. The spreader bar or strut 54 is typically provided in two pieces threadedly joined for adjusting purposes. The strut 54 extends into recesses 60 and 62 respectively formed in brake shoe webs 28 and 32 near shoe ends 38 and 40 so as to be retained in proper position relative to the shoes. Since this particular brake assembly is one which also provides for mechanical parking brake actuation, the strut 54 acts as a mechanical spreader bar when the parking brake is applied.

The parking brake assembly, in addition to the use of strut 54 as a spreader bar, has a parking brake actuating lever 64, which has one end 66 pivotally mounted on the web 32. In this example, the web 32 is provided with an aperture 68 through which the lever end 66, bent so as to extend through the aperture 68, extends to provide a pivoting attachment. Other well-known pivoting attachment methods may be used. Lever 64 is also provided with a recess 70, which also receives one end of the spreader bar 54. Lever 64 extends downwardly immediately adjacent to one side of web 32, terminating in a lever lower end 72. As is well known in the art, when lever 64 is pivoted clockwise as seen in FIG. 1, it will act to move the spreader bar 54 against the brake shoe assembly 18, moving that assembly outwardly to engage the drum friction surface 14, with the lever reaction, exerted through the lever end 66 and web 32 at aperture 68, moving the brake shoe assembly 20 so that its lining also engages the drum friction surface 14. Thus, the brake assembly is mechanically actuated for parking brake purposes.

The drum brake assembly 10 is provided with a parking brake cable assembly 74. Assembly 74 is illustrated as including a cable 76 mounted for axial movement in a cable sheath 78. Sheath 78 terminates in a cable conduit assembly 80, while the cable 76 extends therebeyond inside the drum brake assembly, as will be further described. The other ends of cable 76 and sheath 78 are connected to a parking brake actuating mechanism, such as a pedal assembly, provided for ease of operation by the vehicle operator so that the cable 76 is tensioned when the pedal is actuated to actuate the parking brake mechanism.

The parking brake cable assembly 74 also includes a spring 82 which extends about the portion of cable 76 that extends further into the drum brake assembly beyond the conduit assembly 80. As can be better seen in FIG. 3, the spring end 86 is positioned for engagement with a portion of the lower end 72 of parking brake actuating lever 64. The end 88 of cable 76 is provided with an enlarged end section or other element 90, commonly referred to as a button or bullet.

The particular construction of button 90 and the mating parts of parking brake adjusting lever lower end 72 provide the arrangement to which the invention herein disclosed and claimed is particularly directed. Button 90 is constructed quite differently from the type illustrated in the above-noted Pat. No. 3,064,787, as well as being different from the button of the above-noted patent application Ser. No. 117,120. In the particular invention herein disclosed and claimed, button 90 is barbed or stepped, as will be further described.

A suitable tube guide 92 is secured in the opening 94 formed in the backing plate 16 through which the parking brake assembly is assembled. The tuber guide 92 extends through the opening 94 so that its terminus 96 is positioned near but in a laterally spaced relation to lower end 72 on the parking brake actuating lever 64. More particularly, it is axially aligned with a guide and retention member 100 mounted in lever lower end 72.

Guide and retention member 100 is preferably of a generally tubular shape, with a funnel-shaped receiving end 102 defining a large opening 104 at one funnel end and a smaller opening 106 at the other funnel end, with opening 106 being formed by the inner wall 108 of the tubular portion of member 100. The larger opening 104 faces generally toward the backing plate boss containing the opening 94, and the smaller opening 106 faces in the opposite direction. The funnel-shaped end 102 has an inner surface 110 which acts as a camming guide surface for the button 90, as will be described. Inner surface 110 extends from the large funnel end to the small funnel end. The end 112 of guide and retention member 100 opposite its funnel end 102 is shown as being flanged so that member 100 is axially secured in place in the cylindrically formed end 72 of the parking brake lever 64. One or more annularly arranged series of circumferentially spaced tabs 114 are struck inwardly from the tubular portion of member 100 axially between its funnel end 102 and its other end 112. Four such axially spaced series of tabs 114 are illustrated.

The button 90 is provided with an axially spaced series of generally conical-base formed ridges or barbs 116 so that, as the button 90 is inserted into member 100 via funnel end 102, the tabs 114 have a springing action to deflect as the ridges or barbs pass axially therethrough and therebeyond. This action of the tabs 114 permits the button 90 to be inserted into member 100 until at least one series of tabs 114 is in engagement with the back side of one of the ridges 116, preventing a withdrawal axial movement of the button 90 relative to the member 100. In the preferred embodiment illustrated, there are five ridges 116. Each series of tabs 114 is shown in one-way locking engagement with the back side of a ridge 116. In some instances, the button 90 may be inserted only far enough to have less than all of the tabs engaging ridges, or may be inserted sufficiently far that one or more, but not all, of the ridges have passed beyond all of the tabs. The exact position depends upon the amount of axial movement of cable 76 needed for placing it in proper adjustment.

When the parking brake cable assembly, and particularly the parking brake cable section surrounded by spring 82 and having the enlarged end 90 formed thereon, is inserted through the backing plate opening 94 and tube guide 92 by substantially axial movement of the parking brake cable and button, the cable enlarged end 90 enters the spring guide 98. Cable 76 and button 90 are slightly deflected in their path by the curvature of the tube guide 92 so that, after they pass through that guide and exit through the guide terminus 96, they are aimed substantially at the guide and retention member 100. Therefore, as they are axially moved further into the drum brake assembly, the button 90 passes into the guide and retention member large opening 104 and engages the camming guide surface 110 formed by the inner surface thereof.

Slight additional axial movement of the cable and its enlarged end will position the large end of the cable immediately beyond the smaller end 106 of the guide and retention member 100. Because of the cantilever-like spring-biasing actions of the tabs 114, the ridges 116 pass through the cooperating series of tabs in a snap-fit and retentive manner as the cable extends axially further through the small funnel end 110. This axial extension continues until the cable is fully seated and retained in a cable adjusted position.

This completes the blind attachment of the cable to the parking brake actuating lever, the cable's being in position so that, when a tension force is applied thereto, the force is transmitted to the parking brake actuating lever and will pivot that lever clockwise, as seen in FIG. 1, to mechanically apply the brake assembly. It will be noted that the spring end of spring 82 which is in guide 92 will react on the guide, and the spring end 86 will engage the guide and retention member 106, possibly through a washer at the end of button 90, so as to continually urge the parking brake actuating lever 64 and cable 76 to the release position shown in FIG. 1.

When the assembler-operator has made the blind assembly to the extent above described, he exerts a tension force on the cable 76 by pulling on the conduit assembly 80 in the direction away from the backing plate and feeling the resistance to movement of the cable because of the connection to the parking brake actuating lever 64. Having satisfied himself that the connection has been made, he may then insert the conduit assembly 80 through the tube guide 92 so that the conduit assembly will be retained in the tube guide and sealed therein.

The embodiments of the invention in which an exclusive property or privilege is claimed are defined as follows:

1. In a drum brake assembly having a drum to be braked first and second brake shoe assemblies mounted on a backing plate, service brake actuating means selectively acting on said shoe assemblies to move same into braking engagement with said drum, and parking brake actuating mechanism for mechanically moving said shoe assemblies into braking engagement with said drum for parking brake purposes, said parking brake actuating mechanism including a spreader strut extending between said shoe assemblies, a parking brake lever pivoted at one lever end on one of said shoe assemblies and engaging said strut when pivoted in one direction to spread said shoe assemblies apart and move same into braking engagement with said drum, and a parking brake cable extending through an apertured boss in said backing plate and connected to the other end of said lever for actuation thereof by the application of tension thereto, the improvement comprising:

means for blind assembly and connection of said parking brake cable to said lever other end, said last named means comprising:

said other end of said parking brake lever being formed so as to receive a cable guide and retention member, said guide and retention member having a funnel-shaped first end defining a large opening at one funnel end and a smaller opening at the other funnel end with said larger opening facing toward said backing plate apertured boss, said funnel-shaped first end having an inner surface providing a camming guide surface, said cable guide and retention member having a tubular section with said funnel end smaller opening opening into the inner portion of said tubular section, and a second end on the opposite end of said tubular section from said funnel end, said second end acting to axially secure said guide and retention member to said parking brake actuating lever other end, and at least one annular series of circumferentially spaced spring tabs struck inwardly from said tubular section to extend axially and inwardly toward said tubular section second end;

said parking brake cable having a cable section of relatively small diameter and an enlarged cable end of substantially larger diameter than the diameter of said cable section, said enlarged cable end being on the end of said cable section connected with said lever other end and having a plurality of 360 degree conical-base shaped ridges thereon axially pointing toward said guide and retention member second end, said funnel-shaped end camming guide surface acting to cam and guide said cable enlarged end and said cable into said guide and retention member tubular section with said tabs and said ridges cooperating to provide a one-way securing arrangement with at least one series of tabs engaging the back side of at least one of said ridges to prevent axial movement thereof in a direction toward said guide and relative to said parking brake lever and holding said cable in a locked and adjusted position relative to said parking brake lever and to be operative to exert actuating force on said parking brake lever when said parking brake cable is tensioned to actuate the parking brake.

2. In a blind-assembly drum brake parking brake cable and lever arrangement including a parking brake actuating lever, a brake cable, and guide means for blindly guiding one end of said brake cable to one end of said parking brake actuating lever, the improvement comprising:

said cable one end having a button with an axially spaced series of barb-like 360 degree annular ridges formed thereon;

said parking brake actuating lever one end having a guide and retention member secured thereto, said member having a tubular portion and a funnel end, said funnel end initially receiving said cable button and cam-guiding said button into said guide and retention member tubular portion, said tubular portion having an axially and inwardly extending series of tabs therein, said tabs cooperating with said button ridges to yieldingly permit at least one of said ridges to pass through and beyond at least one of said series of tabs, said tabs through which a ridge has passed then springing inwardly behind that ridge to prevent axial withdrawal movement of said button and said cable from said tubular portion and thus hold said cable in a locked and adjusted position relative to said parking brake lever so as to be operative to exert actuating force on said parking brake lever when said parking brake cable is tensioned to actuate the parking brake.

3. The improvement of claim 2 in which said button ridges are conical-base shaped with the maximum diameters thereof being axially spaced with a predetermined spacing and said tabs having a plurality of tab series which are axially spaced so that the inner ends of said tabs are at the same predetermined axial spacing as said button ridges.

* * * * *